United States Patent
Yoneda et al.

(10) Patent No.: US 7,564,491 B2
(45) Date of Patent: Jul. 21, 2009

(54) PIXEL DEFECT DETECTING/CORRECTING DEVICE AND PIXEL DEFECT DETECTING/CORRECTING METHOD

(75) Inventors: Yutaka Yoneda, Kanagawa (JP); Manabu Koiso, Kanagawa (JP)

(73) Assignee: Sony Corporation, Tokyo (JP)

( * ) Notice: Subject to any disclaimer, the term of this patent is extended or adjusted under 35 U.S.C. 154(b) by 776 days.

(21) Appl. No.: 10/540,058

(22) PCT Filed: Dec. 11, 2003

(86) PCT No.: PCT/JP03/15894

§ 371 (c)(1),
(2), (4) Date: Jun. 22, 2005

(87) PCT Pub. No.: WO2004/059988

PCT Pub. Date: Jul. 15, 2004

(65) Prior Publication Data

US 2006/0012694 A1    Jan. 19, 2006

(30) Foreign Application Priority Data

Dec. 24, 2002  (JP) .............................. 2002-372873

(51) Int. Cl.
*H04N 9/64*  (2006.01)
(52) U.S. Cl. ..................................... 348/246
(58) Field of Classification Search .............. 348/222.1, 348/241, 246, 247
See application file for complete search history.

(56) References Cited

U.S. PATENT DOCUMENTS

| | | | | |
|---|---|---|---|---|
| 5,327,246 | A * | 7/1994 | Suzuki | 348/246 |
| 7,009,644 | B1* | 3/2006 | Sanchez et al. | 348/246 |
| 7,283,164 | B2* | 10/2007 | Kakarala et al. | 348/246 |
| 2002/0196354 | A1* | 12/2002 | Chang et al. | 348/246 |
| 2004/0169746 | A1* | 9/2004 | Chen et al. | 348/246 |
| 2008/0143856 | A1* | 6/2008 | Pinto et al. | 348/246 |

FOREIGN PATENT DOCUMENTS

| | | |
|---|---|---|
| JP | 7 23297 | 1/1995 |
| JP | 10-243300 | 9/1998 |
| JP | 11 355667 | 12/1999 |
| JP | 2001-54127 | 2/2001 |
| JP | 2002-271806 | 9/2002 |
| JP | 2003-158744 | 5/2003 |

* cited by examiner

*Primary Examiner*—Timothy J Henn
(74) *Attorney, Agent, or Firm*—Frommer Lawrence & Haug LLP; William S. Frommer; Thomas F. Presson

(57) ABSTRACT

A pixel defect detecting and correcting apparatus and method for detecting and correcting defects where the number of correctable defect pixels is not restricted to the capacity of a memory. The apparatus includes a color difference and luminance calculating block which calculates the absolute values of the color differences of adjacent pixels and a defect judgment target pixel, and color difference and luminance data. The apparatus also includes a maximum and minimum data values detecting block; a color difference interpolated value calculating block and a luminance interpolated value calculating block which obtain the color difference interpolated values and luminance interpolated values of the defect judgment target pixel.

6 Claims, 3 Drawing Sheets

PIXEL DEFECT DETECTING/CORRECTING DEVICE AND PIXEL DEFECT DETECTING/CORRECTING METHOD

TECHNICAL FIELD

The present invention relates to a pixel defect detecting and correcting apparatus, and a pixel defect detecting and correcting method, for example.

BACKGROUND ART

As pixel defects in a solid-state imaging device, there are a white defect in which a certain amount of electric charge is invariably added to a normal signal (derived from a crystalline defect or the like in a CCD (Charge Coupled Device)), and a black defect in which either a signal level decreases at a certain ratio (derived from scratches on on-chip lenses or the like of a CCD) or a signal level that is 0 or below is invariably output (derived from the opening of a photodiode of a CCD) with respect to a normal signal. These pixel defects become dot-like blemishes at the time of imaging and cause deterioration in image quality, so that various means for detecting and correcting defects by signal processing have been proposed.

With respect to pixel defect detecting and correcting apparatuses which have been conventionally disclosed, in general, pixel defects are detected at the time of adjustment, the positions thereof are stored in a memory device such as a register, those positions are referred to at the time of imaging, an interpolation value is calculated from data of pixels in the vicinity of the target pixel, and interpolation is executed by replacing the defect pixel data with this interpolation value.

For example, in paragraph No. [0018] in Patent Literature 1 is disclosed a mechanism in which correction of pixel defects and defect detection are executed concurrently with imaging; and in order for the number of defects which should be corrected regarding an imaging device to be within a predetermined setting range, a threshold value for level comparison concerning defect detection is variably set in response to the number of defect pixels, and also positional information on the defect pixels, the number of detected frames when the defect pixels have been detected as defect pixels also in frames prior to a present frame, and information showing whether or not correction has been performed in the frame immediately before regarding the defect pixels are stored in single memory means.

Further, in [structure] of ABSTRACT OF THE DISCLOSURE in Patent Literature 2 is disclosed an apparatus including a level difference detecting circuit which detects in a solid-state imaging device the level difference between a first pixel signal from the first pixel and a second pixel signal from a second pixel in the vicinity of the first pixel, a comparator which compares an output signal of this level difference detecting circuit with a predetermined threshold value, and a memory which stores comparison results of a plurality of fields obtained in this comparator; and defect pixels are determined using memory information of this memory.

Further, in [structure] of ABSTRACT OF THE DISCLOSURE in Patent Literature 3 is disclosed an apparatus including a system controller, a switch, and a pre-detection processing circuit which detect, based on an output signal of the CCD element, defect pixels outputting signals of specific levels from among pixels of a CCD element, and further a register which stores positional data on the defect pixels detected thereby; and in which the positional data stored in the resister are deleted.

Further, in [structure] of ABSTRACT OF THE DISCLOSURE in Patent Literature 4 is disclosed a mechanism in which when an inspection of defects is carried out, defect pixels are detected by comparing in a comparator the imaging output level of a CCD solid-state imaging device with a predetermined detection level; the number of these defect pixels detected is counted by a counter; when the detected number exceeds the number allowable in memory, defect-detecting sensitivity is lowered by setting in a detection level setting circuit the detection level of the comparator higher than before, and a re-inspection is repeated until the number of defect pixels becomes allowable.

[Patent Literature 1]
Published Japanese Patent Application No. 2002-51266

[Patent Literature 2]
Published Japanese Patent Application No. H6-284346

[Patent Literature 3]
Published Japanese Patent Application No. H5-260385

[Patent Literature 4]
Published Japanese Patent Application No. H6-315112

DISCLOSURE OF INVENTION

However, in the above-described conventional defect pixel correcting method, the number of defect pixels that are correctable is restricted to the capacity of a memory device, so that in order to increase the number of pixels to be corrected, it is necessary to increase the capacity of the memory device, causing a gate scale of a detection circuit to be enlarged, which is an inconvenience.

Further, defects later occurred and not detected at the time of adjustment due to a change in operative temperature or the like cannot be detected and corrected sufficiently in conventional methods, which is an inconvenience.

Further, in Patent Literature 1, since positional information on defect pixels, the number of frames detected when the defect pixels have also been detected as defect pixels in frames prior to a present frame, and information indicating whether or not there has been correction performed in the frame immediately before with respect to the defect pixels are stored in single memory means, the number of correctable defect pixels is restricted to the capacity of the memory means, and in order to increase the number of correctable pixels, it is necessary to increase the capacity of the memory means, which is an inconvenience.

Further, in Patent Literature 2, since the level difference between a first pixel and a second pixel in the vicinity of the first pixel in an imaging device is detected and the result of a judgment with respect to defect pixels as compared with a threshold value is stored in a memory in advance, the number of correctable defect pixels is restricted to the capacity of the memory, and in order to increase the number of correctable pixels, it is necessary to increase the capacity of the memory, which is an inconvenience.

Further, in Patent Literature 3, since if pixels corresponding to positional data stored in memory means by defect pixel detecting means have not been detected consecutively a predetermined number of times or more, the positional data are deleted from the memory means and although effects caused by conditions at the time of detection including temperature change and the like are removed, the number of correctable defect pixels is restricted to the capacity of the memory means, and in order to increase the number of correctable pixels, it is necessary to increase the capacity of the memory means, which is an inconvenience._

Further, in Patent Literature 4, since the number of defect pixels is counted and when the number thereof has exceeded an allowable number in memory, detection sensitivity is increased by raising a threshold value for level comparison in defect detecting means, so that although the limited capacity of a memory means is used efficiently, the number of correctable defect pixels is restricted to the capacity of the memory means, and in order to increase the number of correctable pixels, it is necessary to increase the capacity of the memory means, which is an inconvenience.

Accordingly, the present invention is made in light of the above-described points and provides a pixel defect detecting and correcting apparatus and a pixel defect detecting and correcting method, in which the number of correctable defect pixels is not restricted to the capacity of a memory device, and further defects subsequently occurred and not detected at the time of adjustment due to a change in operative temperature or the like can be detected and corrected sufficiently.

A pixel defect detecting and correcting apparatus of the present invention includes: color difference and luminance calculating means which calculates the absolute values of the color differences of adjacent pixels and a defect judgment target pixel necessary for defect detection, color difference and luminance data, and data on interpolated value calculation target pixels; maximum and minimum data values detecting means which detects the maximum and minimum values of various data based on values calculated in the color difference and luminance calculating means; color difference interpolated value calculating means which obtains the color difference interpolated values of the interpolated value calculation target pixel with respect to defect judgment target pixels; luminance interpolated value calculating means which obtains the luminance interpolated values of defect judgment target pixels with respect to interpolated value calculation target pixels; defect judgment and interpolation processing means which uses a plurality of defect detecting methods, performs a defect judgment of the defect judgment target pixel with respect to each of the defect detecting methods concurrently, based on data from the maximum and minimum data values detecting means, from the color difference interpolated value calculating means and the luminance interpolated value calculating means, and executes interpolation processing by replacing original data of pixels with interpolated values according to each of the defect detecting methods if the pixel has been judged to be defective; and interpolated value for use selecting means which selects the final output values of pixels judged to be defective obtained by the defect judgment and interpolation processing means; wherein pixel defects are continuously detected and corrected during imaging, and pixel defects in image data are detected and corrected by combining a plurality of defect detecting methods and interpolation methods in the optimum manner.

Therefore, according to the present invention, the following operations are performed.

The color difference and luminance calculating means calculates the absolute value of the color difference of adjacent pixels and the defect judgment target pixel necessary for defect detection, color difference and luminance data, and data on interpolated value calculation target pixels. The maximum and minimum data values detecting means detects the maximum and minimum values of various kinds of data based on values calculated in the color difference and luminance calculating means. The color difference interpolated value calculating means obtains the color difference interpolated values of the defect judgment target pixel with respect to interpolated value calculation target pixels. The luminance interpolated value calculating means obtains the luminance interpolated values of the defect judgment target pixel with respect to the interpolated value calculation target pixels. The defect judgment and interpolation processing means uses a plurality of defect detecting methods, performs a defect judgment of the defect judgment target pixel with respect to each of the defect-detecting methods concurrently, based on data from the maximum and minimum data values detecting means, from the color difference interpolated value calculating means and from the luminance interpolated value calculating means, and executes interpolation processing by replacing original data of pixels with interpolated values according to defect detecting methods, if the pixels have been judged to be defective. The interpolated value for use selecting means selects the final output values of pixels judged to be defective obtained by the defect judgment and interpolation processing means. According to the present invention, pixel defects are continuously detected and corrected during imaging, and pixel defects in image data are detected and corrected by combining a plurality of defect detecting methods and interpolation methods in the optimum manner.

A pixel defect detecting and correcting method of the present invention includes: a color difference and luminance calculating step of calculating the absolute values of the color differences of adjacent pixels and a defect judgment target pixel necessary for defect detection, color difference and luminance data, and data on interpolated value calculation target pixels; a maximum and minimum data values detecting step of detecting the maximum and minimum values of various kinds of data based on values calculated by the color difference and luminance calculating step; a color difference interpolated value calculating step of obtaining the color difference interpolated values of the defect judgment target pixel with respect to interpolated value calculation target pixels; a luminance interpolated value calculating step of obtaining the luminance interpolated values of the defect judgment target pixel with respect to the interpolated value calculation target pixels; a defect judgment and interpolation processing step of using a plurality of defect detecting methods and performing a defect judgment of the defect judgment target pixel with respect to each of the defect detecting methods concurrently, based on data from the maximum and minimum data values detecting step, from the color difference interpolated value calculating step and from the luminance interpolated value calculating step, and of executing interpolation processing by replacing original data of pixels with interpolated values according to the defect detecting methods if the pixels have been judged to be defective; and an interpolated value for use selecting step of selecting the final output values of pixels judged to be defective obtained by the defect judgment and interpolation processing step based on the order of precedence; wherein pixel defects are continuously detected and corrected during imaging, and pixel defects in image data are detected and corrected by combining a plurality of defect-detecting methods and interpolation methods in the optimum manner.

Therefore, according to the present invention, the following operations are performed.

In the color difference and luminance calculating step, the absolute values of the color differences of adjacent pixels and the defect judgment target pixel necessary for defect detection, color difference and luminance data, and data on interpolated value calculation target pixels are calculated. In the maximum and minimum data values detecting step, the maximum and minimum values of various kinds of data are detected based on values calculated in the color difference and luminance calculating step. In the color difference interpolated value calculating step, the color difference interpolated values of the defect judgment target pixel are obtained with respect to interpolated value calculation target pixels. In the luminance interpolated value calculating step, the luminance interpolated values of the defect judgment target pixel are obtained with respect to the interpolated value calculation target pixels. In the defect judgment and interpolation processing step, a plurality of defect-detecting methods are used and a defect judgment of defect judgment target pixels is concurrently performed with respect to each of the defect-detecting methods based on data from the maximum and minimum data values detecting step, from the color difference interpolated value calculating step and from the luminance interpolated value calculating step, and interpolation processing is executed by replacing original data of pixels with interpolated values according to defect detecting methods if the pixels have been judged to be defective. In the interpolated value for use selecting step, the final output values of pixels judged to be defective obtained in the defect judgment and interpolation processing step are selected base on the order of precedence. According to the present invention, pixel defects are continuously detected and corrected during imaging, and pixel defects in image data are detected and corrected by combining a plurality of defect detecting methods and interpolation methods in the optimum manner.

BRIEF DESCRIPTION OF DRAWINGS

FIGS. 2A to 2C show defect detecting methods and detection target pixels, in which FIG. 2A is of a color difference absolute value comparison of adjacent eight pixels; FIG. 2B is of a comparison of adjacent eight pixels; and FIG. 2C is of a comparison between the closest eight pixels;

BEST MODE FOR CARRYING OUT THE INVENTION

Figure 1:
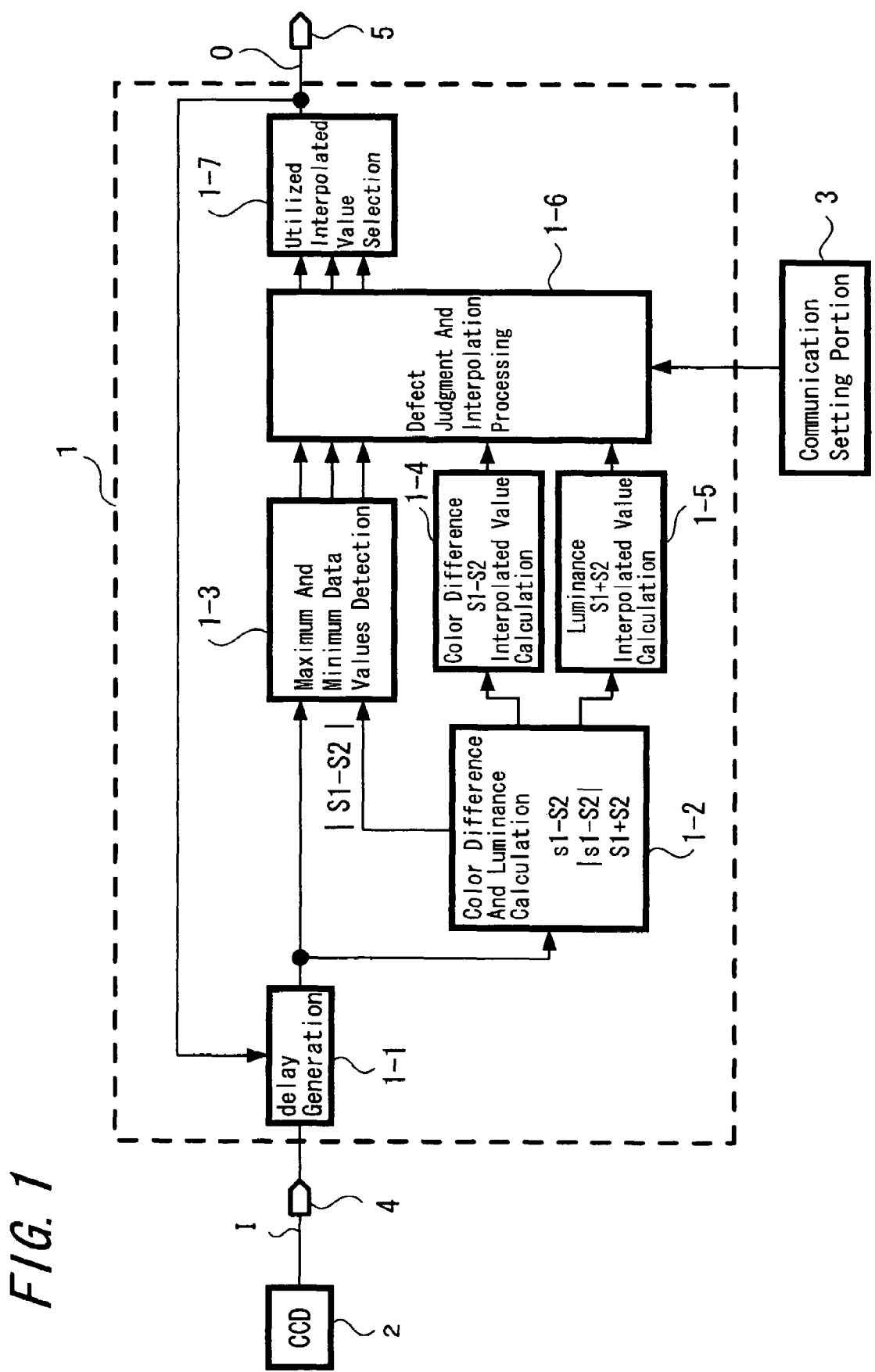
FIG. 1 is a diagram showing a configuration of a defect detection and correction controlling block applied to an embodiment of the present invention.

Hereinafter, an embodiment of the present invention will be explained, referring to the drawings as need arises.

FIG. 1 schematically shows in a simple manner a basic configuration of a defect detection and correction controlling block applied to an embodiment of the present invention.

First, the configuration of a defect detection and correction controlling block 1 applied to this embodiment is explained. The pixel defect detection and correction controlling block 1, which functions as the core of this embodiment, is positioned between an imaging block having a CCD 2 or the like supplying through an input terminal 4 an image input signal I including pixel defects and a camera signal processing block generating a luminance signal and a color signal which supply an image output signal O including data corrected through an output terminal 5.

The defect detection and correction controlling block 1 applied to this embodiment includes a color difference and luminance calculating block (1-2) in which the absolute values of the color differences of adjacent pixels and a defect judgment target pixel necessary for defect detection, color difference and luminance data, and data on interpolated value calculation target pixels are calculated.

Further, the defect detection and correction controlling block 1 includes a maximum and minimum data values detecting block (1-3) in which the maximum and minimum values of various kinds of data are detected based on values calculated in the color difference and luminance calculating means.

Further, the defect detection and correction controlling block 1 includes a color difference interpolated value calculating block (1-4) in which the color difference interpolated values of defect judgment target pixels are obtained with respect to interpolated value calculation target pixels.

Further, the defect detection and correction controlling block 1 includes a luminance interpolated value calculating block (1-5) in which the luminance interpolated values of defect judgment target pixels are obtained with respect to interpolated value calculation target pixels.

Further, the defect detection and correction controlling block 1 includes a defect judgment and interpolation processing block (1-6) which uses a plurality of defect detecting methods, performs a defect judgment of defect judgment target pixels with respect to each of the defect detecting methods concurrently, based on data from the maximum and minimum data values detecting block (1-3), from the color difference interpolated value calculating block (1-4) and from the luminance interpolated value calculating block (1-5), and executes interpolation processing by replacing original data of pixels with interpolated values according to defect detecting methods if the pixel has been judged to be defective.

Further, the defect detection and correction controlling block 1 includes an interpolated value for use selecting block (1-7) in which the final output values of pixels judged to be defective obtained in the defect judgment and interpolation processing block (1-6) are selected.

Further, the defect detection and correction controlling block 1 is configured such that pixel defects are continuously detected and corrected during imaging, and pixel defects in image data are detected and corrected by combining a plurality of defect detecting methods and interpolation methods in the optimum manner.

In addition, the defect detection and correction controlling block 1 includes a delay generating block (1-1) in which delay processing is performed on an image input signal for processing of each of pixels in subsequent blocks.

The defect detection and correction controlling block 1 as configured above applied to the embodiment of the present invention executes the following operations.

By optimizing the calculation methods of the color difference and luminance calculating block (1-2), the color difference interpolated value calculating block (1-4) and the luminance interpolated value calculating block (1-5), the defect detection and correction controlling block 1 can be applied to each of a complementary-color signal processing system and a primary-color signal processing system, and can be independent from imaging modes such as a single-board, multi-board or the like of CCD. Hereinafter, an example applied to the single-board complementary-color signal processing system is described.

In the defect detection and correction controlling block 1 applied to the embodiment of the present invention, the color difference and luminance calculating block (1-2), the maximum and minimum data values detecting block (1-3), the color difference interpolated value calculating block (1-4), the luminance interpolated value calculating block (1-5), the defect judgment and interpolation processing block (1-6) and the interpolated value for use selecting block (1-7) execute the following operations.

Figures 2A, 2B, 2C:
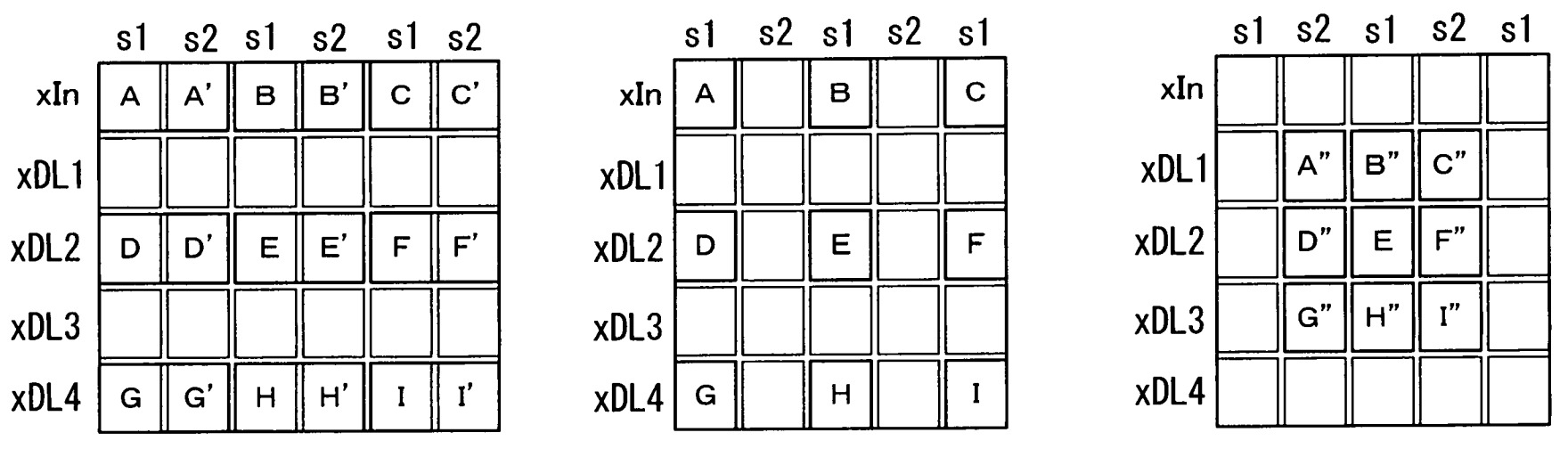

In the color difference and luminance calculating block (1-2), as the absolute values of the color differences of adjacent eight pixels and a defect judgment target pixel necessary for defect detection, |A−A'|, |B−B'|, |C−C'|, |D−D'|, |F−F'|, |G−G'|, |H−H'|, |I−I'| and |E−E'| are calculated with respect to defect detection comparing target pixels in the color difference absolute value comparison of adjacent eight pixels shown in FIG. 2A.

Figures 3, 4:
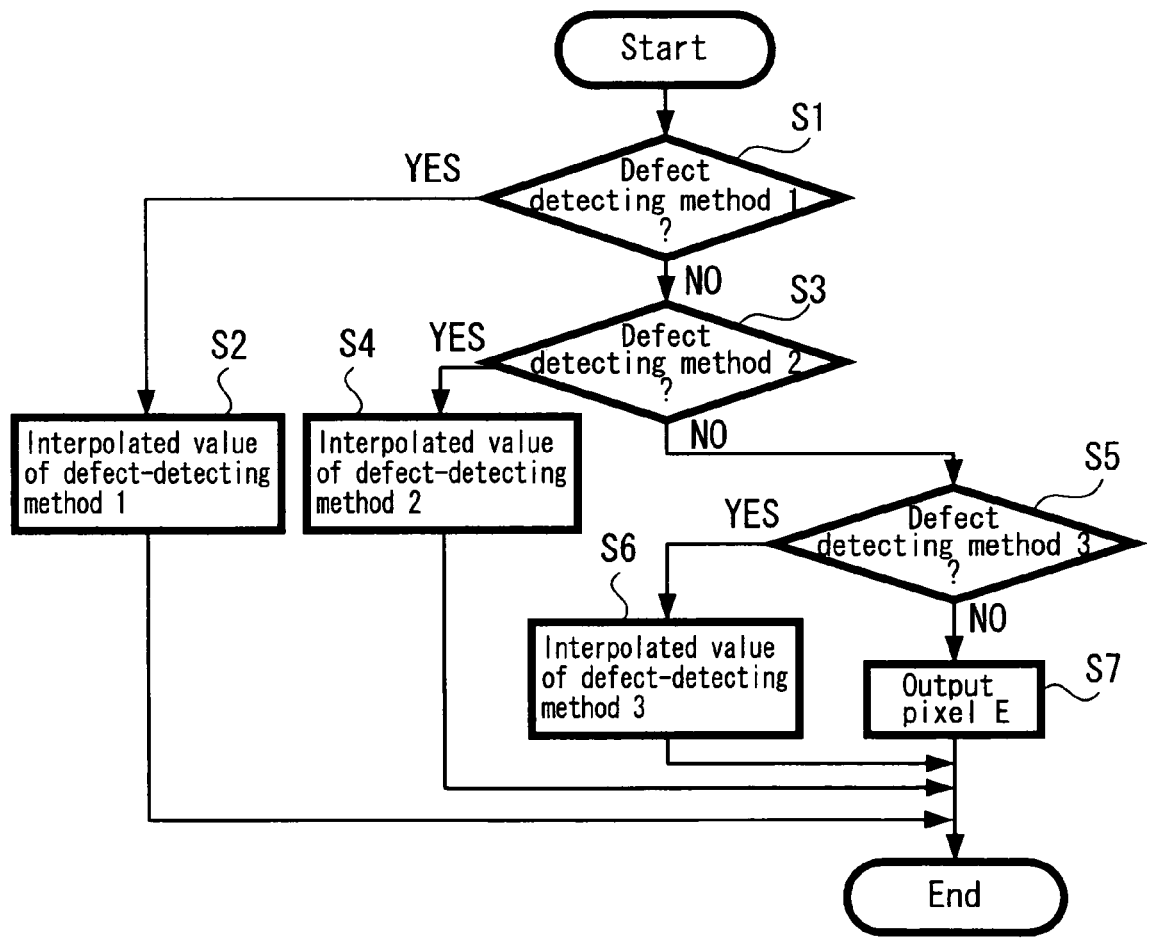
FIG. 3 is a view showing interpolated value calculation target pixels.
FIG. 4 is a flow chart showing operation of an interpolated value for use selecting block.

Further, color difference and luminance data used in the color difference interpolated value calculating block (1-4) and the luminance interpolated value calculating block (1-5) are calculated as B−B', D−D', E−E', F−F', H−H', and B+B', D+D', E+E', F+F', H+H' with respect to the interpolated value calculation target pixels shown in FIG. 3.

In the maximum and minimum data values detecting block (1-3), the maximum and minimum values of various kinds of data used in the defect judgment and interpolation processing block (1-6) are detected based on the values calculated in the color difference and luminance calculating block (1-2).

With respect to each of the defect detecting methods separately, in defect pixel detection based on the color difference absolute value comparison between adjacent eight pixels shown in FIG. 2A, the maximum value is detected from among |A−A'|, |B−B'|, |C−C'|, |D−D'|, |F−F'|, |G−G'|, |H−H'| and |I−I'|; in defect pixel detection based on the comparison between adjacent eight pixels shown in FIG. 2B, the maximum and minimum values are detected from among A, B, C, D, F, G, H and I; and in defect pixel detection based on the comparison between the closest eight pixels shown in FIG. 2C, the maximum and minimum values are detected from among A", B", C", D", F", G", H" and I".

In the color difference interpolated value calculating block (1-4), interpolated values are calculated as follows. First, with respect to the interpolated value calculation target pixels shown in FIG. 3, a vertical color difference correlation coefficient $Kc\_v=|(B-B')-(H-H')|/2$ and a horizontal color difference correlation coefficient $Kc\_h=|(D-D')-(F-F')|/2$ are calculated, and then a vertical/horizontal color difference correlation coefficient $Kc\_hv=Kc\_h/(Kc\_h+Kc\_V)$ is calculated, where $Kc\_hv=0.5$ when $Kc\_h+Kc\_v=0$. Further, a vertical interpolated value $c\_v=(((B-B')+(H-H'))/2)\times Kc\_hv$ and a horizontal interpolated value $c\_h=(((D-D')+(F-F'))/2)\times(1-Kc\_hv)$ are calculated, and the color difference interpolated value $E\_c\_hv=E'+(c\_v+c\_h)$ of the defect judgment target pixel E is obtained.

In the luminance interpolated value calculating block (1-5), interpolated values are calculated as follows. First, with respect to the interpolated value calculation target pixels shown in FIG. 3, a vertical luminance correlation coefficient $Ky\_v=|(B+B')-(H+H')|/2$ and a horizontal color difference correlation coefficient $Ky\_h=|(D+D')-(F+F')|/2$ are calculated, and then a vertical/horizontal color difference correlation coefficient $Ky\_hv=Ky\_h/(Ky\_h+Ky\_V)$ is calculated. Further, a vertical interpolated value $y\_v=(((B+B')+(H+H'))/2)\times Ky\_hv$ and a horizontal interpolated value $y\_h=(((D+D')+(F+F'))/2)\times(1-Ky\_hv)$ are calculated, and a luminance interpolated value $E\_y\_hv=E'-(y\_v+y\_h)$ of the defect judgment target pixel E is obtained.

In the defect judgment and interpolation processing block (1-6), three defect detecting methods are used to concurrently perform a defect judgment of the defect judgment target pixel E with respect to each of the defect detecting methods, based on data from the maximum and minimum data values detecting block (1-3), from the color difference interpolated value calculating block (1-4) and from the luminance interpolated value calculating block (1-5), and interpolation processing is executed by replacing original data of the pixel E with an interpolated value in accordance with defect detecting methods if the pixel E has been judged to be defective.

A first defect detecting method 1 is defect pixel detection based on the color difference absolute value comparison between adjacent eight pixels shown in FIG. 2A.

In the case where E is a defect judgment target pixel, in the defect judgment and interpolation processing block (1-6), the maximum value from among the color difference absolute values of adjacent eight pixels calculated in the maximum and minimum data values detecting block (1-3) is multiplied by a coefficient α1 which can be arbitrary set from the outside based on the setting from a communication setting portion 3 on the outside to be obtained as a threshold value T1.

Further, the defect judgment and interpolation processing block (1-6) calculates the absolute value $|E\_y\_hv-E\_c\_hv|$, which is the absolute value of the difference between the color difference interpolated value $E\_c\_hv$ of the defect judgment target pixel E and the luminance interpolated value $E\_y\_hv$ of the defect judgment target pixel E calculated in the color difference interpolated value calculating block (1-4) and in the luminance interpolated value calculating block (1-5), respectively.

In addition, in the defect judgment and interpolation processing block (1-6) a value, as a limit value L, is calculated by multiplying the absolute value of the defect judgment target pixel E by a coefficient β1 which can be arbitrary set from the outside by means of communication setting from the communication setting portion 3 on the outside. After comparing these calculation results, if the relation expressed with the following Formula 1 is obtained, the defect judgment target pixel E is judged to be defective.

$|E-E'|>T1$ (condition 1-1) and $|E\_y\_hv-E\_c\_hv|<L$ (condition 1-2)   [Formula 1]

In this defect detecting method, color difference which is the difference between adjacent pixels is used to further emphasize the defect and when compared with the other two defect detecting methods, this method can be applied to a variety of images with less erroneous detection. By taking the absolute values of color differences, erroneous detection can be reduced in a portion such as a boundary area of an image, where massive change occurs in signal level. In addition, the limitation of the condition 1-2 is usually not satisfied in normal image portion, on the contrary the limitation of the condition 1-2 is usually satisfied in defective portion, so that erroneous detection of normal pixels can be prevented. Further, this limitation is efficient to prevent erroneous detection of the pixel which is immediately before a defect.

Luminance interpolated values are employed as the optimum interpolated values in this detection method. Even if interpolation processing is executed on normal pixels erroneously detected, the effects on image quality can be minimized.

A second defect detecting method 2 is defect pixel detection based on the comparison between adjacent eight pixels shown in FIG. 2B.

In the case where E is a defect judgment target pixel, the defect judgment and interpolation processing block (1-6) multiplies the maximum value from among adjacent eight pixels calculated by the maximum and minimum data values detecting block (1-3) by a coefficient α2 arbitrary set from the outside based on communication setting from the communication setting portion 3 on the outside to obtain a threshold value T2_max.

Similarly, the defect judgment and interpolation processing block (1-6) multiplies the minimum value from among the adjacent eight pixels by a coefficient γ2 arbitrary set from the outside based on communication setting from the communication setting portion 3 on the outside to obtain a threshold value T2_min. In the case where the relation in the following Formula 2 is satisfied after comparing these calculation results, the defect judgment target pixel E is judged to be defective.

$$E>T2\_max \text{ (condition 2-1) or } E<T2\_min \text{ (condition 2-2)} \quad \text{[Formula 2]}$$

Compared with the other two defect detecting methods, this detection method can be applied to an image with intense contrast such as black-and-white stripes to obtain high detection efficiency with less erroneous detection. Color difference interpolated values are employed as the optimum interpolated values in the present detection method.

A third defect detecting method 3 is defect pixel detection based on the comparison between the closest eight pixels shown in FIG. 2C.

In the case where E is a defect judgment target pixel, the defect judgment and interpolation processing block (1-6) multiplies the maximum value from among the closest eight pixels obtained by the maximum and minimum data values detecting block (1-3) by a coefficient α3 arbitrary set from the outside based on communication setting from the communication setting portion 3 on the outside to obtain a threshold value T3_max.

Similarly, the defect judgment and interpolation processing block (1-6) multiplies the minimum value from among the closest eight pixels by a coefficient γ3 arbitrary set from the outside based on communication setting from the communication setting portion 3 on the outside to obtain a threshold value T3_min. In the case where the relation in the following Formula 3 is satisfied after comparing these calculation results, the defect judgment target pixel E is judged to be defective.

$$E>T3\_max \text{ (condition 3-1) or } E<T3\_min \text{ (condition 3-2)} \quad \text{[Formula 3]}$$

With respect to a bright image (light-reflecting portion, lamp or the like) likely to be erroneously detected in the other two defect detecting methods, signal levels of the closest pixels even with a different color filter are often similar to each other. On the contrary, if a defect exists, often there may be difference between the signal level of the defect detected pixel and that of the closest pixels with a different color filter. Thus, according to this detection method, defect detecting sensitivity can be improved in bright image portions, where detection by the other two defect detecting methods is difficult. In this detection method, luminance interpolated values are employed as the optimum interpolated values.

In the interpolated value for use selecting block (1-7) is selected the final output value, which has been obtained in the defect judgment and interpolation processing block (1-6), of the pixel E judged to be defective. As described above, three defect detecting methods and interpolation processing that is optimized for each of the three methods are performed in the defect judgment and interpolation processing block (1-6); an image suitable to be applied to each of the three defect detecting methods, in which erroneous detection is reduced and the highest defect detecting efficiency is maintained, is different with respect to the three methods. Accordingly, the final output value of the pixel E is selected in light of the characteristics of respective defect detecting methods as follows.

FIG. 4 is a flow chart showing operation of the interpolated value for use selecting block (1-7).

In FIG. 4, in Step S1 it is judged whether or not a pixel has been detected to be defective by the first defect detecting method 1. If the pixel has been detected in Step S1 to be defective by the first defect detecting method 1, the interpolated value of the first defect detecting method 1 is output in Step S2, regardless of judgmental results of the other detection methods.

In the case where the pixel has been detected not to be defective by the first defect detecting method 1 in step S1, it is judged in Step S3 whether or not the pixel has been detected to be defective by the second defect detecting method 2. In the case where the pixel has been detected to be defective by the second defect detecting method 2, unless in Step S4 the pixel has been detected to be defective by the first defect detecting method 1, the interpolated value of the second defect detecting method 2 is output, regardless of a judgment result of the defect detecting method 3.

In the case where the pixel has been detected not to be defective by the second defect detecting method 2 in Step S3, it is judged in Step S5 whether or not the pixel has been detected to be defective by the third defect detecting method 3. In the case where the pixel has been detected to be defective by the third defect detecting method 3, the interpolated value of the third defect detecting method 3 is output in Step S6, on condition that the pixel has not been detected to be defective by the other two defect detecting methods.

If the pixel has not been detected to be defective by any of the defect detecting methods, the value of the pixel E is output in Step S7 without applying any processing.

According to the embodiments described above, first, since interpolation processing is executed immediately after pixel defects have been detected, a memory device for storing positions of defect pixels is not necessary and areas in which defect detection and correction are performed can be prevented from being restricted.

Secondly, since a memory device for storing positions of defect pixels is not necessary, defect correction can be carried out with respect to all pixels at low cost.

Thirdly, since defect detection and interpolation are continuously executed at the time of imaging, defects subsequently generated from change in the temperature of an imaging device or the like can be detected and corrected.

Fourthly, a plurality of defect detections and interpolation processing suitable for each of the detections are concurrently executed, and a final interpolated output value is decided based on the characteristics of respective defect detecting methods, so that erroneous detection of normal pixels after interpolation can be minimized.

Fifthly, since a threshold value used when defect detection is executed is set based on communication setting for each of defect detecting methods, erroneous detection of normal pixels can be minimized and the efficiency in detecting defect pixels can be maximized.

Sixthly, since the combination of defect detecting methods and interpolation methods is optimized, the effects on image quality deterioration can be minimized, even in the case where normal pixels are erroneously detected and interpolation processing is executed thereon.

Seventhly, since a limit to detection is set at the time of defect detection, based on the relationship between the signal level of interpolated values calculated from luminance and color difference and the signal level of the detection target pixel, the state of an image likely to be erroneously detected is detected and the erroneous detection can be prevented.

It goes without saying that the present invention is not limited to the above-described embodiments but other configurations within the scope of claims of the present invention can be applied thereto, accordingly.

In a pixel defect detecting and correcting apparatus which detects and corrects pixel defects in image data picked up by imaging means, a pixel defect detecting and correcting apparatus of the present invention includes: color difference and luminance calculating means which calculates the absolute values of the color differences of adjacent pixels and a defect judgment target pixel necessary for defect detection, color difference and luminance data, and data on interpolated value calculation target pixels; maximum and minimum data values detecting means which detects the maximum and minimum values of various data based on values calculated by the color difference and luminance calculating means; color difference interpolated value calculating means which obtains the color difference interpolated values of the defect judgment target pixel with respect to interpolated value calculation target pixels; luminance interpolated value calculating means which obtains the luminance interpolated values of the defect judgment target pixel with respect to interpolated value calculation target pixels; defect judgment and interpolation processing means which uses a plurality of defect-detecting methods, performs a defect judgment of defect judgment target pixels with respect to each of the defect-detecting methods concurrently, based on data from the maximum and minimum data values detecting means, from the color difference interpolated value calculating means and from the luminance interpolated value calculating means, and executes interpolation processing by replacing original data of pixels with interpolated values according to defect detecting methods if the pixels have been judged to be defective; and interpolated value for use selecting means which selects the final output values of pixels judged to be defective obtained by the defect judgment and interpolation processing means; wherein pixel defects are continuously detected and corrected during imaging, and pixel defects in image data are detected and corrected by combining a plurality of defect detecting methods and interpolation methods in the optimum manner; accordingly, since interpolation processing is executed immediately after detecting pixel defects, a memory device for storing positions of defect pixels is not necessary, thereby preventing areas executing defect detection and correction from being restricted, and since defect detection and interpolation are continuously executed at the time of imaging, defects subsequently generated from change in the temperature of an imaging device or the like can be detected and corrected.

Further, as described above, with respect to defect judgment in the defect judgment and interpolation processing means, the pixel defect detecting and correcting apparatus of this invention sets a limit on the defect judgment, using color difference interpolated values and luminance interpolated values for defect judgment target pixels, so that by setting a limit on detection at the time of defect detection based on the relationship between the signal level of interpolated values calculated from luminance and color difference and the signal level of the detection target pixel, the state of an image which is likely to be erroneously detected can be detected, and thus erroneous detection can be reduced.

Further, as described above, with respect to defect judgment and interpolation processing in the defect judgment and interpolation processing means, the pixel defect detecting and correcting apparatus of this invention concurrently executes each defect detection and interpolation processing, using a plurality of defect detecting methods and an interpolation method that is optimized for each of the defect detecting methods so as to minimize deterioration in image quality even if erroneous detection is performed, and selects the final interpolated output value by deciding the final interpolated output value based on the characteristics of respective defect detecting methods in the above interpolated value for use selecting means, so that erroneous detection of normal pixels after interpolation can be minimized by concurrently executing the plurality of defect detections and interpolation processing suitable for each of the detections to decide the final interpolated output value based on the characteristics of respective defect detecting methods, and since the combination of the defect detecting methods and the interpolation methods is optimized, the effects on image quality deterioration can be minimized even if interpolation processing is executed on normal pixels erroneously detected.

Further, as described above, with respect to the pixel defect detecting and correcting apparatus of this invention, since the above limit can arbitrarily be set from the outside, erroneous detection of normal pixels can be minimized and the efficiency in detecting defect pixels can be maximized by deciding a threshold value used when detecting defect based on communication setting for each of the defect detecting methods.

In a pixel defect detecting and correcting method which detects and corrects pixel defects in image data picked up by imaging means, a pixel defect detecting and correcting method of the present invention includes: a color difference and luminance calculating step of calculating the absolute values of the color differences of adjacent pixels and a defect judgment target pixel necessary for defect detection, color difference and luminance data, and data on interpolated value calculation target pixels; a maximum and minimum data values detecting step of detecting the maximum and minimum values of various kinds of data based on values calculated in the color difference and luminance calculating step; a color difference interpolated value calculating step of obtaining the color difference interpolated values of the defect judgment target pixel with respect to interpolated value calculation target pixels; a luminance interpolated value calculating step of obtaining the luminance interpolated values of the defect judgment target pixel with respect to interpolated value calculation target pixels; a defect judgment and interpolation processing step of using a plurality of defect detecting methods and performing a defect judgment of the defect judgment target pixel with respect to each of the defect detecting methods concurrently, based on data from the maximum and minimum data values detecting step, from the color difference interpolated value calculating step and from the luminance interpolated value calculating step, and of executing interpolation processing by replacing original data of pixels with interpolated values according to defect detecting methods if the pixels have been judged to be defective; and an interpolated value for use selecting step of selecting the final output values of pixels judged to be defective obtained in the defect judgment and interpolation processing step based on the order of precedence; wherein pixel defects are continuously detected and corrected during imaging, and pixel defects in image data are detected and corrected by combining a plurality of defect-detecting methods and interpolation methods in the optimum manner; accordingly, since interpolation processing is executed immediately after pixel defects have been detected, a memory device for storing positions of defect pixels is not necessary, thereby preventing areas executing defect detection and correction from being restricted, since defect detection and interpolation are continuously executed at the time of imaging, defects subsequently generated from change in the temperature of an imaging device or the like can be detected and corrected, and further the interpolated value of defect detection can be output in order of precedence.

Further, as described above, with respect to the pixel defect detecting and correcting method of this invention, since the order of precedence in the above interpolated value for use selecting step is color difference absolute value comparison of adjacent eight pixels, comparison of adjacent eight pixels, and comparison between the closest eight pixels, it is possible to output the interpolated value of defect detection in the order of: color difference absolute value comparison of adjacent eight pixels, comparison of adjacent eight pixels, and comparison between the closest eight pixels.

DESCRIPTION OF REFERENCE NUMERALS

1 ... DEFECT DETECTION AND CORRECTION CONTROLLING BLOCK
1-1 ... DELAY GENERATING BLOCK
1-2 ... COLOR DIFFERENCE AND LUMINANCE CALCULATING BLOCK
1-3 ... MAXIMUM AND MINIMUM DATA VALUES DETECTING BLOCK
1-4 ... COLOR DIFFERENCE INTERPOLATED VALUE CALCULATING BLOCK
1-5 ... LUMINANCE INTERPOLATED VALUE CALCULATING BLOCK
1-6 ... DEFECT JUDGMENT AND INTERPOLATION PROCESSING BLOCK
1-7 ... INTERPOLATED VALUE FOR USE SELECTING BLOCK
2 ... CCD
3 ... COMMUNICATION SETTING PORTION
4 ... INPUT TERMINAL
5 ... OUTPUT TERMINAL
I ... IMAGE INPUT SIGNAL INCLUDING PIXEL DEFECTS
O ... IMAGE OUTPUT SIGNAL INCLUDING DATA CORRECTED

The invention claimed is:

1. A pixel defect detecting and correcting apparatus which detects and corrects pixel defects in image data picked up by imaging means, comprising:
   color difference and luminance calculating means which calculates the absolute values of the color differences of adjacent pixels and a defect judgment target pixel necessary for defect detection, color difference and luminance data, and data on interpolated value calculation target pixels;
   maximum and minimum data values detecting means which detects the maximum and minimum values of various kinds of data based on values calculated in the color difference and luminance calculating means;
   color difference interpolated value calculating means which obtains the color difference interpolated values of the defect judgment target pixel with respect to interpolated value calculation target pixels;
   luminance interpolated value calculating means which obtains the luminance interpolated values of the defect judgment target pixel with respect to interpolated value calculation target pixels;
   defect judgment and interpolation processing means which, using a plurality of defect detecting methods, concurrently performs defect judgment of the defect judgment target pixel with respect to each of defect detecting methods, based on data from said maximum and minimum data values detecting means, from said color difference interpolated value calculating means and from said luminance interpolated value calculating means, and which replaces original data of pixels with interpolated values according to defect detecting methods to execute interpolation processing if the pixels have been judged to be defective; and
   interpolated value for use selecting means which selects the final output value of the pixel judged to be defective obtained in said defect judgment and interpolation processing means;
   wherein pixel defects are continuously detected and corrected during imaging, and pixel defects in image data are detected and corrected by combining a plurality of defect detecting methods and interpolation methods.

2. A pixel defect detecting and correcting apparatus according to claim 1,
   wherein with respect to defect judgment in said defect judgment and interpolation processing means, a limit is set to the defect judgment, using color difference interpolated values and luminance interpolated values for defect judgment target pixels.

3. A pixel defect detecting and correcting apparatus according to claim 1,
   wherein in defect judgment and interpolation processing in said defect judgment and interpolation processing means, a plurality of defect-detecting methods and an interpolation method, which is optimized for each of the defect detecting methods to minimize deterioration in image quality even when erroneous detection is performed, are used to concurrently execute each defect diction and interpolation processing and the final interpolated output value is decided in said interpolated value for use selecting means based on the characteristics of the defect detecting methods to select the final interpolated output value.

4. A pixel defect detecting and correcting apparatus according to claim 2,
   wherein said limit can be arbitrary set from the outside.

5. A pixel defect detecting and correcting method which detects and corrects pixel defects in image data picked up by imaging means, comprising the steps of:
   calculating the absolute values of the color differences of adjacent pixels and a defect judgment target pixel necessary for defect detection, color difference and luminance data, and data on interpolated value calculation target pixels;
   detecting the maximum and minimum values of various kinds of data based on values calculated in the color difference and luminance calculating step;
   obtaining the color difference interpolated values of the defect judgment target pixel with respect to interpolated value calculation target pixels;
   obtaining the luminance interpolated values of the defect judgment target pixel with respect to interpolated value calculation target pixels;
   performing a defect judgment of the defect judgment target pixel with respect to each of the defect detecting methods concurrently, using a plurality of defect detecting methods, based on data from said maximum and minimum data values detecting step, from said color difference interpolated value calculating step and from said luminance interpolated value calculating step, and executing interpolation processing by replacing original data of pixels with interpolated values according to defect detecting methods if the pixel has been judged to be defective; and
   selecting the final output values of the pixel judged to be defective which is obtained in said defect judgment and interpolation processing step;
   wherein pixel defects are continuously detected and corrected during imaging, and pixel defects in image data are detected and corrected by combining a plurality of defect detecting methods and interpolation methods.

6. A pixel defect detecting and correcting method according to claim 5,
   wherein the order of precedence in said interpolated value for use selecting step is: color difference absolute value comparison of adjacent eight pixels, comparison of adjacent eight pixels, and comparison between the closest eight pixels.

* * * * *